United States Patent [19]

Herndon

[11] Patent Number: 5,046,687
[45] Date of Patent: * Sep. 10, 1991

[54] ADAPTIVE TORSO RESTRAINT SYSTEM

[75] Inventor: Gerald F. Herndon, Bellevue, Wash.

[73] Assignee: The Boeing Company, Seattle, Wash.

[*] Notice: The portion of the term of this patent subsequent to Jan. 19, 2005 has been disclaimed.

[21] Appl. No.: 223,166

[22] Filed: Jul. 22, 1988

[51] Int. Cl.$^5$ .......................................... B64D 25/115
[52] U.S. Cl. ......................... 244/122 AG; 244/122 R; 297/216; 297/284; 297/475; 297/479; 280/801; 280/808
[58] Field of Search ....... 244/122 R, 122 A, 122 AG; 297/216, 284, 464, 474, 475, 479, 480; 280/801, 808

[56] References Cited

U.S. PATENT DOCUMENTS

| | | | |
|---|---|---|---|
| 2,195,334 | 3/1940 | Lethern | 244/122 R |
| 3,077,324 | 2/1963 | Strickland, Jr. | 244/122 R |
| 3,178,136 | 4/1965 | Bayer | 244/122 AG |
| 3,178,223 | 4/1965 | Martin | 297/385 |
| 3,271,797 | 9/1966 | Boyce | 244/122 AG |
| 3,287,064 | 11/1966 | Freeman | 244/122 AG |
| 3,623,768 | 11/1971 | Capener | 244/122 AG |
| 3,698,670 | 10/1972 | Ewing | 244/122 AG |
| 3,757,744 | 9/1973 | Pravaz | 244/122 AG |
| 3,773,382 | 11/1973 | Coursault et al. | 297/284 |
| 4,437,628 | 3/1984 | Schwartz | 244/122 AG |
| 4,488,691 | 12/1984 | Lorch | 244/151 R |
| 4,592,523 | 6/1986 | Herndon | 244/122 AG |
| 4,613,101 | 9/1986 | Herndon | 244/122 R |
| 4,637,629 | 1/1987 | Cummings | 297/464 |
| 4,655,417 | 4/1987 | Herndon | 244/122 A |
| 4,667,901 | 5/1987 | Herndon | 244/122 A |
| 4,667,904 | 5/1987 | Herndon | 244/122 R |
| 4,720,064 | 1/1988 | Herndon | 244/122 AG |

FOREIGN PATENT DOCUMENTS 134625 11/1919 United Kingdom .
552292 3/1943 United Kingdom .

OTHER PUBLICATIONS

"Technical Data Digest", vol. 16, p. 8, Improved Pilot Shoulder Harnesses Withstand 38.6 G Crashes.

Primary Examiner—Joseph F. Peters, Jr.
Assistant Examiner—Christopher P. Ellis
Attorney, Agent, or Firm—Seed and Berry

[57] ABSTRACT

A restraint system is provided for restraining a pilot in a safe position during high-acceleration conditions. A stationary harness portion is attached to the pilot's body and haulback straps are connected in a slidable manner to the stationary harness. Under normal conditions, the pilot has some freedom of movement to lean forward or move from side to side. In the event of high acceleration or other emergency conditions, a pair of haulback straps that are slidably attached at the mid-torso position of the pilot are retracted to bring the entire back of the pilot against the back support of his seat. Lateral support pads positioned at the back and side of the pilot are moved to provide support to the sides, ribs and lumbar regions of the mid-torso and to restrain side-to-side movement of the pilot. The position of the lateral support pads is automatically adjusted according to the size of the pilot.

12 Claims, 2 Drawing Sheets

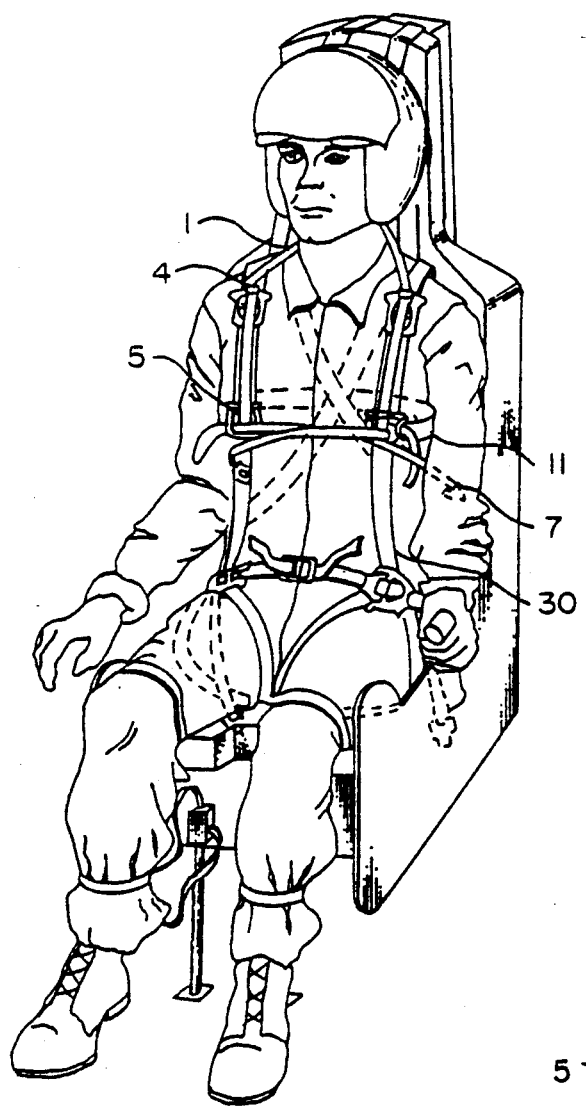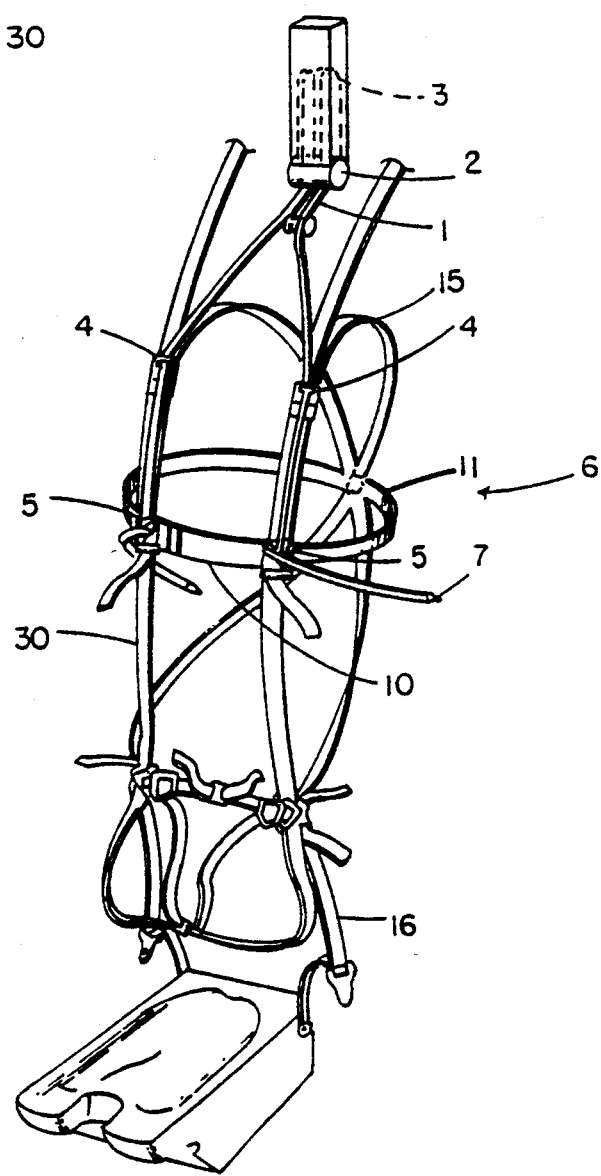
FIG. 2
FIG. 1

ADAPTIVE TORSO RESTRAINT SYSTEM

DESCRIPTION

1. Technical Field

This invention relates to restraining devices for pilots when subject to high acceleration, and more particularly, to a haulback and lateral support device for use during high acceleration flight maneuvers ejection of the pilot or other emergency situations.

2. Background Art

The increased maneuvering capability of present and future high-performance military aircraft imposes greater accelerations on the crew members than previous aircraft. These accelerations occur in all three dimensions, front-back, vertical and lateral. It is important that the pilot be in the proper control position during high-acceleration flight maneuvers. Accelerations on the pilot in an aircraft can be so great as to prevent him from sitting in a position to properly control the aircraft or even prevent him from reaching the ejection handle. This may occur if the pilot temporarily loses control of the aircraft, such as during a flat spin. In such an instance, the pilot could likely recover control of the aircraft if he can place his body in the proper control position.

Great accelerations are also present during ejection of the pilot from the aircraft. Previously, there have been problems in that a pilot may eject from the aircraft prior to a crash only to have his spine damaged during the ejection due to the high acceleration forces produced by the ejection process.

Most present restraint systems includes some type of a powered reel and torso retraction system which allows the pilot to lean forward or from side to side when there are no excessive accelerations present. The reel locks when high accelerations are sensed. Unfortunately, in some systems, this merely locks the straps in their present position and prevents them from being extended further without placing the occupant in a control or safe position. In some systems the pilot's shoulders and pelvis are pulled against the seat backrest prior to ejection, but their is little or not restraint provided for the torso.

The prior art includes different types of systems for restraining a pilot. Some of these systems include retraction devices, such as that taught by Lethern in U.S. Pat. No. 2,195,334, which can be retracted under emergency conditions to more tightly restrain the pilots. The prior art also includes an inflatable bag at the back of the person, such as that taught in the patent to Ewing, U.S. Pat. No. 3,698,670, in which the back of the pilot is caused to assume an arcuate posterior curvature during high acceleration. The prior art also shows complete bodyrestraining devices including solid vests or shells around the chest and other body parts, as taught in the patent to Freemen, U.S. Pat. No. 3,287,064, or the one taught by Boyce in U.S. Pat. No. 3,271,797. Many of the prior art devices, such as those discussed by Bayer in U.S. Pat. No. 3,178,136, or Strickland, Jr., in U.S. Pat. No,. 3,077,324, include haulback straps which, when retracted, come from a position behind the shoulders of the pilot and act in various ways to restrain the shoulders of the pilot. Other publications in the field include U.S. Pat. Nos. 4,437,628; 4,488,691 and 3,178,223, and British Pat. Nos. 134,625 and 552,292, as well as a publication in the *Technical Data Digest*, Vol. 16, p. 8, titled "Improved Pilot Shoulder Harnesses Withstand 38.6 G Crashes."

Other related patents by the same inventor and commonly owned are U.S. Pat. Nos. 4,667,904; 4,655,417; 4,613,101; 4,667,901; and 4,592,523, all of which are incorporated herein by reference.

If the torso is restrained only at the hips and shoulders in a sharp turn, quick flight maneuver, ejection, etc., the acceleration forces on the body can cause severe hyperextension (arching) of the spine resulting in vertebra or spinal cord injury.

DISCLOSURE OF THE INVENTION

It is an object of the invention to provide a restraint system for restraining a pilot's torso and spine in a safe position.

It is another object of the invention that the restraint system restrain the entire torso of the pilot in an emergency situation while permitting freedom of movement at other times.

It is another object of the invention that the spine and back of the pilot be in a non-injury prone position against the back of the seat during high-acceleration conditions.

It is a further object of the invention to provide lateral support to the torso of the pilot during a high-acceleration condition.

It is a further object of the invention that the lateral support provided be automatically adjusted to the size of the pilot's chest.

These and other objects of the invention are accomplished by providing a restraint system having haulback straps attached to a retraction device extending along the shoulders of the pilot and down to the mid-torso position. At the mid-torso position, the straps are connected in a slidable manner to a portion of the harness worn by the pilot and are attached to the seat back behind the back of the pilot. This configuration restrains the pilot at the torso as well as along entire spine, from the shoulders through to the lower torso. A front torso strap is provided at the mid-torso position, such as at the chest or abdomen regions.

A lateral torso restraint operating in conjunction with the haulback straps is provided. The haulback straps pass over a particular portion of a bolster pad and exert a force on the pad, thereby causing it to rotate at the same time that the haulback straps bring the shoulders and back of the pilot into a restrained, safe position. The relationship between the lateral torso restraint pads and the haulback strap is such that the divergence of angle of the strap determines the magnitude of the force component acting to rotate the pads in a position to provide the lateral and back support.

The haulback straps and lateral support pads are attached through emergency release pins so that the occupant can quickly be freed from the retraction system, if necessary.

BRIEF DESCRIPTION OF THE DRAWINGS

FIG. 1 is an isometric view of one embodiment of the restraint system.

FIG. 2 is an isometric view of a second embodiment of the restraint system, with the pilot occupying the seat.

BEST MODE FOR CARRYING OUT THE INVENTION

Figure 3:
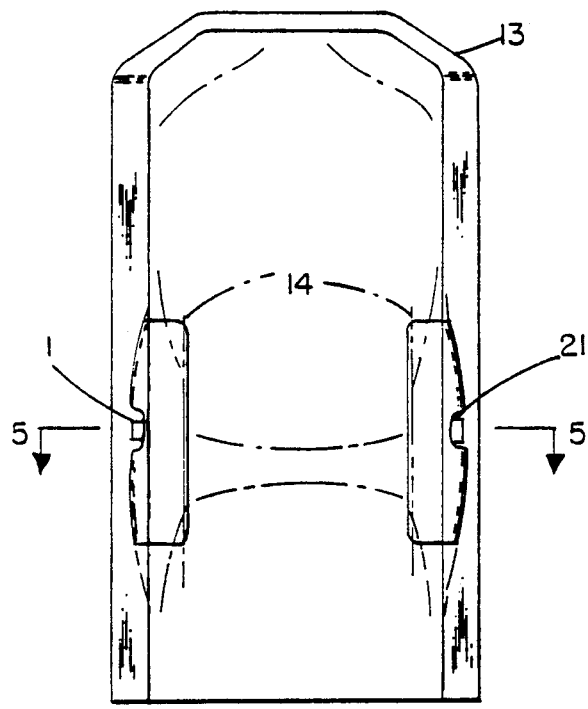
FIG. 3 is a front elevational view of the lateral torso restraint and backrest contour adjustment.

The restraint system, generally designed as 6, extends across the shoulders, around the chest, and across the lap or hips of the pilot as shown in FIGS. 1 and 2. The restraint system 6 is comprised of a stationary harness 30 and slidable haulback straps 1. The stationary portions of the harness 30, are strapped to the pilot's body and do not change position relative to his body. Two haulback straps 1 extend from an inertia reel 2 across the shoulders of the pilot to the mid-torso position. The haulback straps 1 are connected in a slidable manner through guide fittings 4 at the shoulder position to the rest of the stationary harness 30 so that relative movement between the straps and the harness at the guide fittings 4 is possible. The haulback straps 1 connect in a slidable manner at a mid-torso position through fittings 5, which permit movement of the haulback straps 1 within the fittings in a slidable manner. The fittings 5 are shaped to permit the haulback straps 1 to turn at an angle and attach at a point towards the back of the pilot in anchor 7. The fittings 4 and 5 permit slidable connection of the haulback straps 1 to the stationary portions 30 of the harness. This configuration permits the pilot to lean forward or move from side to side, as desired, while still being connected to the haulback device as well as being firmly connected to portions of the harness.

The two haulback straps 1 are attached to a light spring to permit the pilot to lean from side to side with no restriction of movement. During such movement, any excess slack is taken up by a spring-loaded reel to retain a firm fit at all times.

A chest strap 10 extends between the two guide fittings 5 at the mid-torso position. The harness can also include, if desired, straps 11 and hip-restraining or lap support straps, labeled generally as 16.

The anchor fittings 7 of the haulback straps 1 are attached to the ejection seat generally at a mid-torso position and behind the front of the pilot. This attachment point, in conjunction with the shape and location of guide fittings 5, acts to place a positive force on the mid-torso of the pilot when the straps are retracted. The exact position of attachment of fittings 7 and the angle of the straps coming out of the guide fitting 5 will affect the force applied to the torso of the pilot. The fittings are arranged such that the force exerted on the body is to align the entire torso of the pilot with the back of the seat to place the spinal cord and vertebra in a safe and known position during high acceleration or emergency conditions.

The use of the chest strap 10 extending across the front of the body in the same general region as connection of the haulback straps to fittings 5 applies the force of the retraction device across the chest to pull the entire chest into an aligned position. The force from haulback straps 1 is applied to strap 10 through guide fittings 5. This keeps the harness 30 in the correct position oh the body. The strap 10 holds the harness 30 on the shoulders and body when forces are applied through fittings 5. This aids in pulling the spine into proper alignment with the back of the pilot positioned firmly against the back of the seat.

The inertial retraction reel 2 includes a strong spring-loaded inertial reel or a gas discharge reel or other known high-speed, high-powered retraction device. A retraction device such as that taught in U.S. Pat. No. 4,667,904 is usable herewith. During a high-acceleration flight maneuver or an emergency ejection, the haulback straps 1 are retracted with sufficient force to pull the straps through fittings 4 and 5, pulling the pilot's shoulders, chest, mid-torso and lower body firmly against the back of the seat.

The embodiment of FIG. 1 includes a single set of haulback straps extending through two sets of fittings 4, 5. However, for further restraint, additional haulback straps can extend through additional guide fittings 4 and 5 across the torso of the pilot. For example, another pair of guide fittings 5 could be provided, one at the upper chest region, one in the abdomen region, one in the hip region, etc., each being attached at respective anchor points 7 through slidable guide fittings 5 to the stationary harness 30 to independently restrain body parts of the pilot.

FIG. 2 shows a second embodiment of the torso restraint system of the present invention. A pilot is shown in the restaint system just prior to ejection from the aircraft. The haulback straps extend from a reel 2, shown in FIG. 1, and are attached in a slidable manner to the harness through guide fittings 4 and 5 across the mid-torso and shoulder positions of the pilot. In this embodiment, the straps cross each other, with the strap on the right shoulder of the pilot running through the guide fitting 5 across the front portion of the torso of the pilot and being attached at the left side of the ejection seat. Similarly, the haulback strap from the left shoulder is connected through a guide fitting 5 to the right side of the pilot's seat. This particular crossing connection can be used in place of or in addition to mid-torso strap 10, shown in FIG. 1. Back strap 11 is necessary if the embodiment of FIG. 2 is used to ensure that the harness 30 stays in the proper position on the body.

The embodiment of FIG. 2, like the embodiment of FIG. 1, includes an inertial reel 2. The reel 2 exerts a large force on the haulback straps 1 in the event of a high acceleration maneuver or emergency ejection. This retraction force brings the shoulders, torso, chest and hips of the pilot firmly against the seat as the haulback straps 1 slide through guide fittings 4 and 5. The haulback straps 1 tighten across the chest and sides of the pilot to hold the entire upper body of the pilot firmly in position against the back of the seat.

The inertial reel 2 is triggered to retract the haulback straps 1 in response to different types and levels of acceleration. For example, a sensor is placed on the seat, on the haulback straps themselves or other part of the aircraft to sense a sudden force exerted on the pilot'-body. Lateral accelerations of a certain level trigger the inertial reel, and vertical or front-back acceleration of the same or different levels trigger the inertial reel. Further, a manual switch is provided to permit the pilot to activate the retraction device whenever desired.

When the haulback straps are retracted, the pilot is held in the correct position to continue to fly the aircraft. His spine will not be damaged either by continued flight maneuvers or ejection. A portion of the harness structure 30 is firmly attached to the pilot's body such as straps 10, 11, 15, etc. at predetermined locations. Haulback straps 1 are attached in a slidable manner to the stationary harness portion 30. The pilot can move freely and straps 10, 11, 15, etc. remain in the correct position on his torso and shoulders. When the haulback straps are retracted the force is applied to the correct points on the pilot's torso the restrain him in the proper position.

The pilot can manually release the retracted position of the haulback straps and once again resume normal flight conditions with full movement ability, the device being usable repeatedly and reset as desired.

Figure 4:
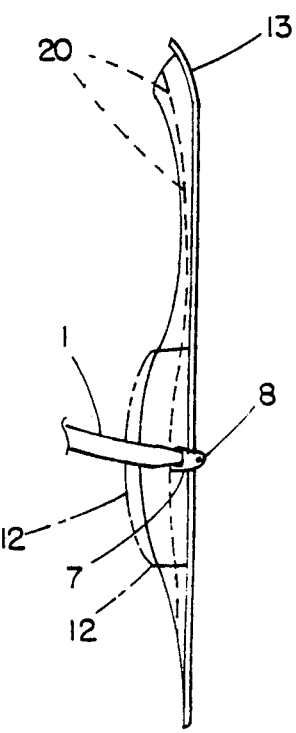
FIG. 4 is a side elevational view of the lateral torso restraint and backrest contour adjustment.
Figure 5:
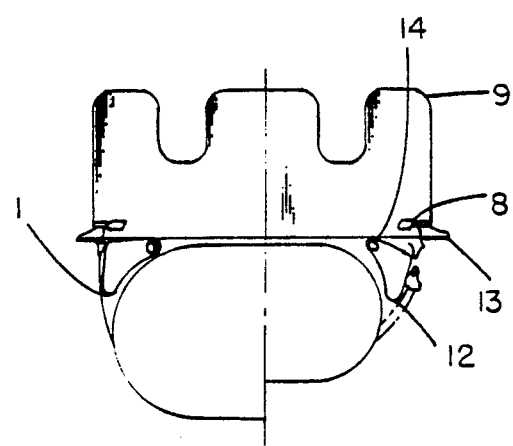
FIG. 5 is a cross-sectional view taken along lines 5—5 of FIG. 3.

FIGS. 3, 4 and 5, illustrate adjustable lateral support pads 12 which pivot about pad anchor axis 14. Pivot axis 14 is not at the center of the pads. By pivoting about 14, the position of the pads with respect to the torso of the pilot is significanty changed. Anchor 14 may be mounted on a track to be a slidable connecting anchor. Alternatively, pad anchor axis 14 may be a sliding pivot to provide additional support at different positions, if desired. A spring-load device, gas-powered actuator or other movable arm may attach to the lateral support pads, acting to rotate them in response to acceleration or ejection.

During normal flight conditions, the lateral support pads 12 and backrest 20 are mounted as a part of the back of the seat 13 and are held in the open position. In the open position, the pads 12 permit the pilot to easily lean forward or move from side to side. In the event of an emergency situation, the pads 12 are rotated inward to provide restraining support to the lumbar, rib cage and side regions along the entire torso of the pilot. In this position, side-to-side movement of the pilot is restrained. The lateral support pads can move in conjunction with the haulback straps or independent of them.

A particular advantage is achieved in facilitating the automatic position adjustment of the lateral support pads 12 through haulback straps 1 according to the size of the torso of the pilot. The force applied through guide fittings 5 pulls the torso of the pilot back against the seat. As the pilot is pulled against the back of the seat, a component of the force is applied by straps 1 to the support pads 12. The amount of the force applied to the support pads 12 by haulback straps 1 will be related to the position of the guide fittings 5 and the angle of divergence of the haulback straps 1 which extend from out of the guide fittings 5 over the pads 12 and to anchor point 7. If the pilot is relatively small, there is a relatively great initial angle of divergence and the initial force applied to the pads 12 is correspondingly greater. As the adjustable lateral pads 12 move into a closer position, the angle of divergence decreases so that the force applied is less. As the adjustable lateral support pads come into firm contact with the sides of the pilot, they reach a position where the angle of divergence is at a minimum. The force applied holds the pads 12 in a firm position preventing lateral movement of the pilot. In the event the pilot is a larger chested person, the initial angle of divergence is less, and the force acting to move the pads 12 is less. As the haulback device is retracted, the component of force applied to the lateral support pads changes, and the force acts to align the pads 12 with the sides of the larger chested pilot to hold them firmly in position. The large chested pilot is held firmly in position and lateral movement is restrained without applying undue force to his body. The lateral restraint pads 12 provide proper support to restrain side-to-side movement in pilots ranging from small to large in size. The pads are automatically adaptable to the particular size of the pilot in providing proper support. In this way, the position and movement of the pads 12 are adjusted according to the size of the torso of the pilot. If the pilot has a small torso, as represented by the first percentile torso of FIG. 5, the lumbar support pads are moved to a greater degree to snugly fit against the sides of the pilot. If the pilot has a relatively large torso, then the adjustable pad 12 moves to a different position to provide snug restraining support.

The particular relationship between the haulback straps 1, guide fittings 5, and anchor points 7 and lateral support pads 12 provides the adaptability. The initial force applied to bring the pads 12 into position as well as the final force, which holds the pads in the restraining position, are affected by this relationship.

The relative positions of guide fittings 5, anchor fittings 7 and size and shape of the lateral support pads are factors that determine the component of force applied to the lateral support pads. The relative positions of the guide fittings 4 and 5 are adjustable on the stationary harness 30 as desired by the pilot. They may be moved up or down, taking into account such factors as desired sitting position, chest size, etc.

The present invention has the advantage that a single harness design and lateral support pads fit all pilots or crew members and many different aircraft. The customization ability of this restraint system is a distinct advantage in ensuring that each pilot, whether large or small, is placed in the proper position to prevent spinal injury.

This invention has been described with respect to some embodiments of the invention. It will be recognized by those skilled in the art that the features of this invention may be adapted to various other embodiments to safely restrain an occupant in a chair during emergency situations, even though the details of the system and operation thereof may vary from the embodiments shown here.

I claim:

1. A torso restraint apparatus comprising:
   a seat;
   a restraint system, including a stationary harness and haulback straps, said stationary harness including a strap extending over each shoulder, along the side, and to the lower torso region of a user, the haulback straps being slidably attached to said stationary harness straps at a plurality of locations on each respective strap, a first attachment point being generally adjacent said shoulder region and a second attachment point generally adjacent at a mid-torso position on the user on each of said respective straps; and
   a retraction device of retracting the haulback straps, said haulback straps being connected at one end to the retraction device and at the other end to the seat.

2. The apparatus of claim 1, further including movable pads attached to the seat in the torso region to firmly contact the sides of the user.

3. The apparatus of claim 2 wherein the movable pads pivot about an axis.

4. The apparatus of claim 2 wherein the straps contact the movable pads and exert a force on said pads to cause them to change position when the straps are retracted.

5. A seat harness for a crewmember in an aircraft, comprising:
   a seat;
   a harness that attaches to a user;
   a pair of retractable straps that are attached to the harness in a slidable manner at the mid-torso position of the crewmember, one end of the straps being attached to the seat;
   the harness including a strap that extends across the front of the mid-torso region of the crewmember; and pads attached to the back of the seat having the retractable straps in contact with the pads and exerting a force on the pads to cause them to pivot about an axis when the straps are retracted.

6. The seat harness according to claim 5 wherein the straps contacting the pads extend from the user's body to a seat connection at an angle with respect to a straight line between the connection on the seat and a tangent of the user'body.

7. The seat harness according to claim 6 wherein the angle is different for different sizes of users prior to the retraction of the straps.

8. The seat harness of claim 6 wherein the pads can be pivoted into a position to restrain side-to-side movement of the user.

9. The seat harness of claim 5 wherein the amount of force exerted on the pads by the straps is related to the size of the crewmember wearing the seat harness.

10. The seat harness according to claim 5 wherein a portion of the harness is firmly connected to predetermined portions on the crewmember's body and the retractable straps are movable with respect to the crewmember's body.

11. The torso restrain apparatus according to claim 1 wherein said stationary harness includes a strap extending laterally across the torso of said user.

12. The torso restraint apparatus according to claim 1 wherein said stationary harness straps are significantly wider than said haulback straps.

* * * * *

UNITED STATES PATENT AND TRADEMARK OFFICE
CERTIFICATE OF CORRECTION

PATENT NO. : 5,046,687

DATED : September 10, 1991

INVENTOR(S) : Gerald F. Herndon

It is certified that error appears in the above-identified patent and that said Letters Patent is hereby corrected as shown below:

In column 6, claim 1, line 46, please delete "of" and substitute therefor -- for --.

In column 7, claim 6, line 9, please delete "user'body" and substitute therefor -- user's body --.

Signed and Sealed this

First Day of June, 1993

Attest:

MICHAEL K. KIRK

Attesting Officer

Acting Commissioner of Patents and Trademarks